US006813787B2

United States Patent
Rosenberg

(10) Patent No.: US 6,813,787 B2
(45) Date of Patent: Nov. 9, 2004

(54) PORTABLE SHOWER

(76) Inventor: Maury Rosenberg, 1525 Putnam Ave., Unit 301, Old Greenwich, CT (US) 06870

( * ) Notice: Subject to any disclaimer, the term of this patent is extended or adjusted under 35 U.S.C. 154(b) by 0 days.

(21) Appl. No.: 10/339,309

(22) Filed: Jan. 10, 2003

(65) Prior Publication Data
US 2004/0133973 A1 Jul. 15, 2004

(51) Int. Cl.[7] .................................. A47K 3/28
(52) U.S. Cl. .................... 4/601; 4/599; 4/612
(58) Field of Search .................. 4/599, 601, 602, 4/603, 605, 612, 670

(56) References Cited

U.S. PATENT DOCUMENTS

| 432,712 | A | * | 7/1890 | Taylor | 4/601 |
|---|---|---|---|---|---|
| 1,065,265 | A | * | 6/1913 | Nordmark | 4/601 |
| 1,758,115 | A | * | 5/1930 | Kelly | 239/282 |
| 2,026,981 | A | * | 1/1936 | Kahnt | 15/22.2 |
| 2,336,402 | A | * | 12/1943 | Kaiser | 4/601 |
| 3,040,335 | A | * | 6/1962 | Gellmann | 4/570 |
| 3,098,241 | A | * | 7/1963 | Booker et al. | 4/670 |
| 3,121,235 | A | | 2/1964 | Gellmann | |
| 3,184,762 | A | * | 5/1965 | Logan et al. | 4/601 |
| 3,391,409 | A | * | 7/1968 | Gatley | 4/602 |
| 3,564,621 | A | * | 2/1971 | Fletcher | 4/615 |
| 3,913,839 | A | | 10/1975 | Wilson | |
| 3,961,770 | A | * | 6/1976 | Wrasman | 251/315.05 |
| 4,457,031 | A | * | 7/1984 | Moore | 4/614 |
| 4,545,083 | A | | 10/1985 | Searson | |
| 5,678,258 | A | | 10/1997 | Healy | |
| 5,799,346 | A | | 9/1998 | Tiernan | |
| 6,227,456 | B1 | | 5/2001 | Colman | |
| 6,447,023 | B1 | * | 9/2002 | Grimm | 285/319 |
| 6,606,753 | B2 | * | 8/2003 | Minnick | 4/694 |
| 6,612,624 | B1 | * | 9/2003 | Segal et al. | 285/330 |

* cited by examiner

Primary Examiner—Henry Bennett
Assistant Examiner—Amanda Flynn
(74) Attorney, Agent, or Firm—St. Onge Steward Johnston & Reens LLC

(57) ABSTRACT

A shower device made of lightweight, easily assembled parts that can be adapted to a water source for hand-held or stationary water delivery at varying heights of water distribution. This sort of water delivery device enables one with compromised height, e.g, a handicapped person, to enjoy the full extent of water delivery during a shower, as well as allowing multiple head shower capability in a single head installation. The shower system is a kit comprising parts that are coded in a particular fashion to provide error-free assembly instruction by sight (such as color, numbers, alphabet, etc.) or touch (i.e., Braille or other forms of tactile identification).

7 Claims, 3 Drawing Sheets

PORTABLE SHOWER

This application is related to Disclosure Document number 500,467, filed on Sep. 28, 2001.

BACKGROUND OF THE INVENTION

1. Field of the Invention

The present invention relates to water delivery apparatus and, more particularly, to a portable shower device.

2. Discussion of the Prior Art

The prior art is replete with water delivery devices for shower capabilities. The U.S. Patent to Coleman (U.S. Pat. No. 6,227,456) discloses a shower system that diverts the water delivery into two directions so that a lower shower head may be in use simultaneously with a higher shower head. The U.S. Patent to Tiernan (U.S. Pat. No. 5,799,346) issued Sep. 1, 1998, also teaches of a dual shower head having movable tubular sections.

The U.S. Patent to Healy issued Oct. 21, 1997, discloses a multiple showerhead device. Herein, an apparatus has a wall mounted water pipe supporting a plurality of individual showerheads by swivel joints and manual on/off valves for selective operation. Apertures are provided on the housing through which the showerheads protrude.

Wilson teaches in U.S. Pat. No. 3,913,839, (issued Oct. 21, 1975) of a dual shower attachment device wherein a single shower may be converted into a dual shower with water delivery outlets at opposite sides of the shower. Gellmann (U.S. Pat. No. 3,121,235, issued Feb. 18, 1964) discloses a shower line unit with a plurality of showerheads positioned along a unit line of the shower device.

None of these patents either teaches or suggests a water delivery device used for a shower having easily assembled pipe construction that is portable for use indoors or outdoors.

SUMMARY OF THE INVENTION

The present invention features a shower device made of lightweight, easily assembled parts that can be adapted to a water source for hand-held or stationary water delivery at varying heights of water distribution. This sort of water delivery device enables one with compromised height, e.g., a handicapped person, to enjoy the full extent of water delivery during a shower, as well as allowing multiple head delivery in lieu of a single head system. The shower system is a kit comprising parts that are coded in a particular fashion to provide error-free assembly instruction by sight (such as color, numbers, alphabet, etc.,) or touch (i.e., Braille or other tactile identification means).

It is therefore an object of the invention to provide a modular water delivery system that is lightweight and easy to transport.

It is another object of the invention to provide a modular water delivery system that is easy to assemble and disassemble with error-free construction assembly means incorporated into the system.

It is also an object of the invention to provide a water delivery system with standard sized plumbing for shower capabilities.

It is a further object of the invention to provide a water delivery system with selective water delivery outlets at various positions within a bathing unit.

These and other objects, features and advantages will be more apparent from a study of the enclosed text and the appended drawings.

dr

BRIEF DESCRIPTION OF THE DRAWINGS

A complete understanding of the present invention may be obtained by reference to the accompanying drawings, when taken in conjunction with the detail description thereof and in which.

DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 1:
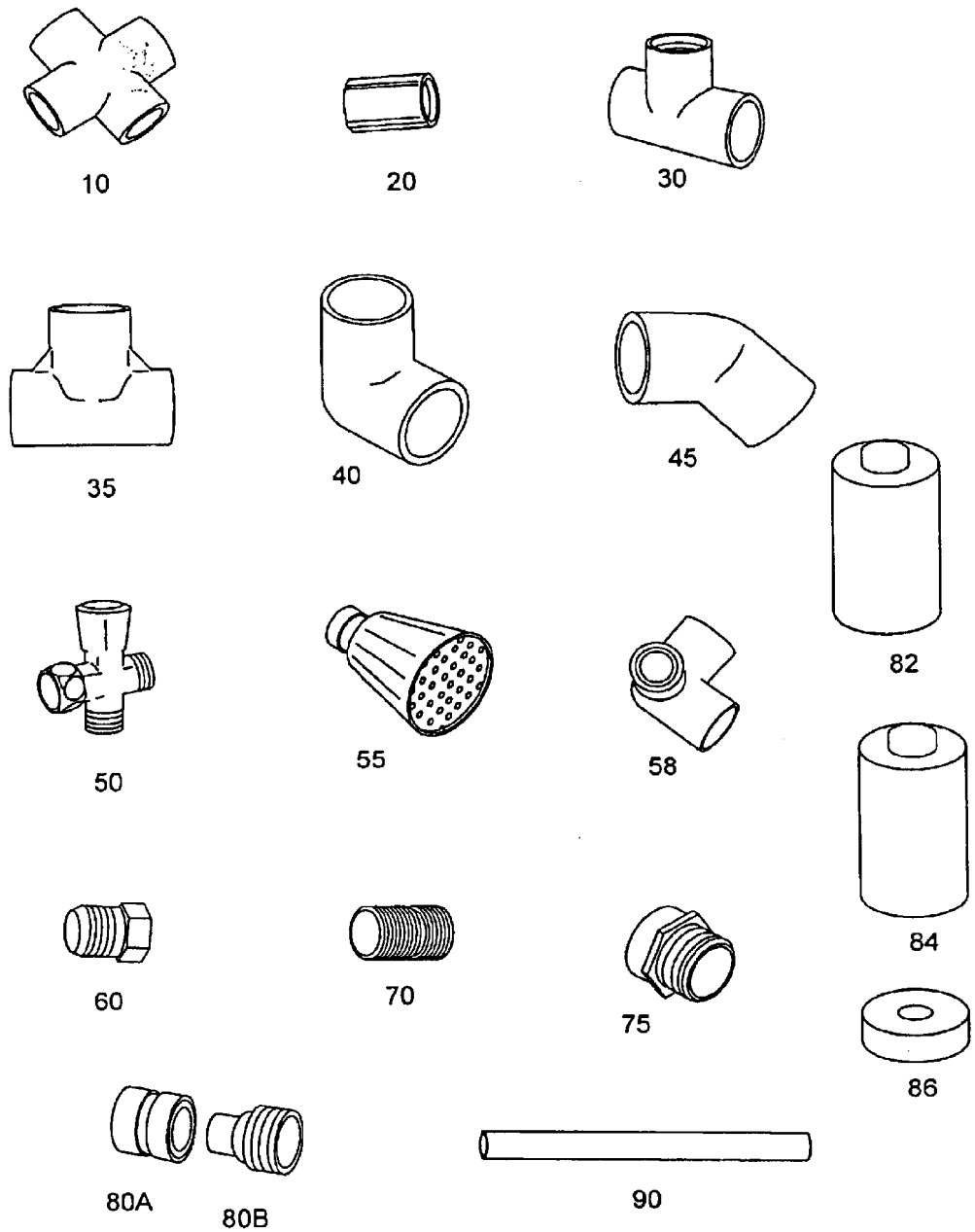
FIG. 1 shows the unassembled compounts of the water delivery kit of the of the present invention.

Generally speaking this invention relates to water delivery systems for showers that alternatively divides water delivered from one outflow into a plurality of water streams. As shown in FIG. 1, the water delivery system 100 is comprised of various types of plumbing accessories to be described herein.

It is a prime object of the present invention to provide a portable, shower device that is easily assembled, and that provides a choice between water delivery configurations. These objects are achieved by the plumbing parts, (i.e., pipes 90, elbow couplers 40 & 45, outlets 30, etc.) being specifically manufactured to facilitate such. The parts are made of a pre-cut and pre-molded suitable material, such as PVC.

Figure 2:
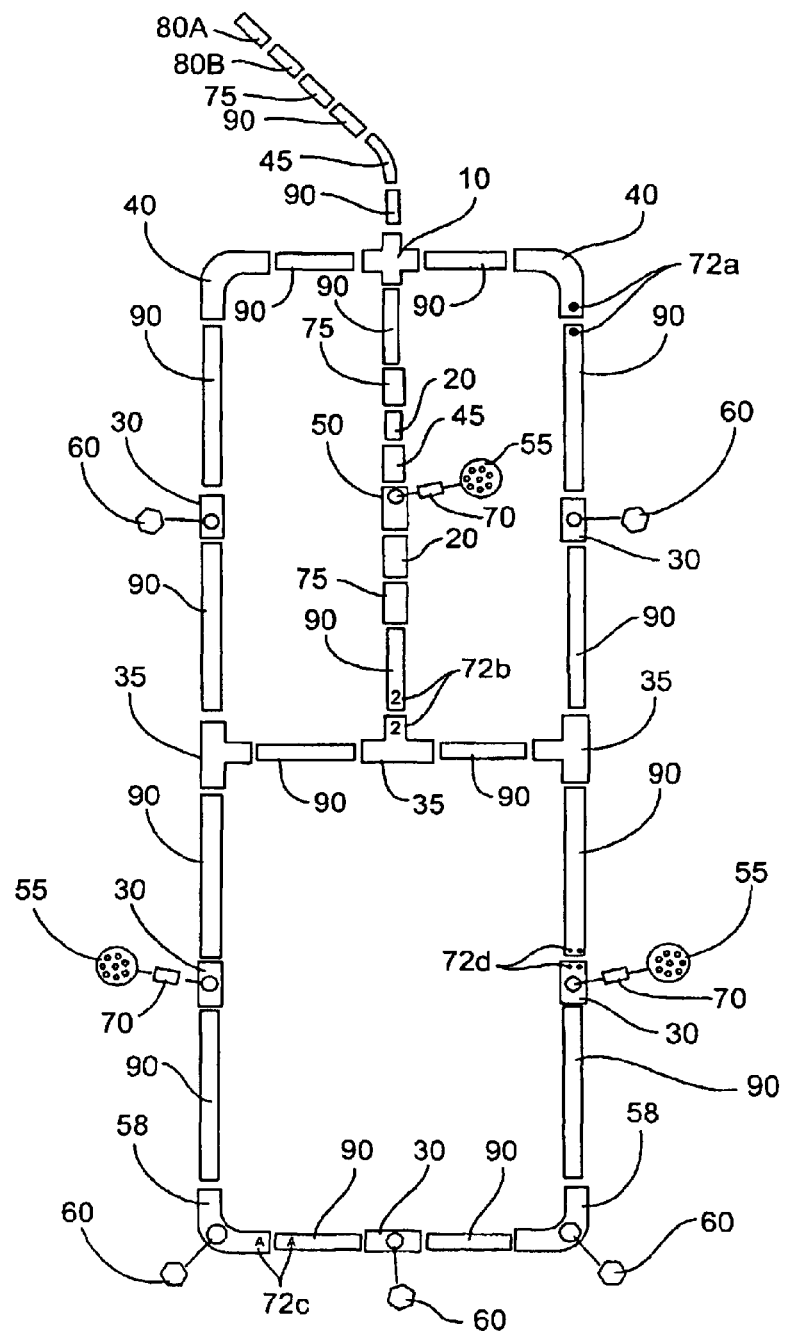
FIG. 2 is a schematic illustrating the components of the water delivery kit, as they would be assembled in accordance with the present invention.
Figure 3:
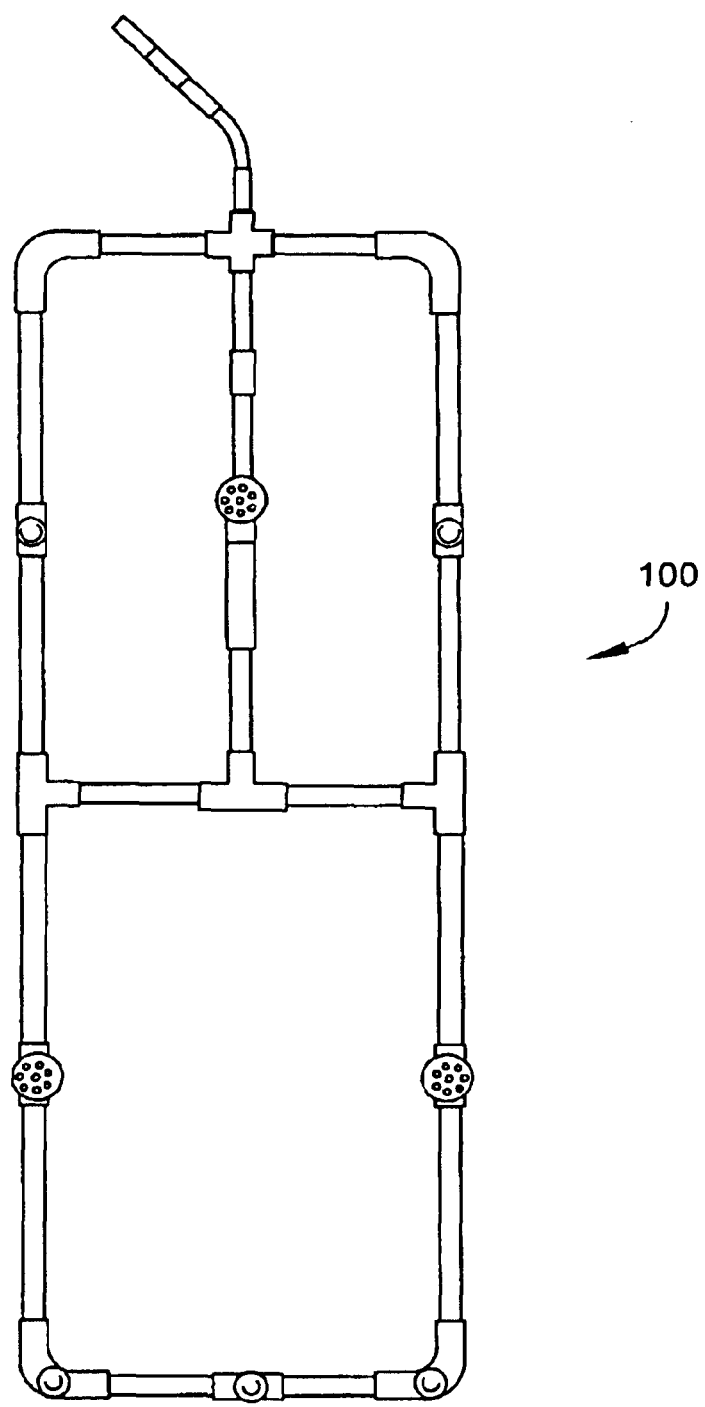
FIG. 3 shows the assembled components of the water delivery kit.

FIG. 2 shows the individual parts of a preferred embodiment of the water delivery system 100 laid out for assembly and how the parts are configured to provide a square panel shower capability. However, it is to be appreciated by those of ordinary skill in the art that other shower configurations may be employed with minor changes to the connections between the parts. Other configuration options include, but are not limited to, fixed, wall mounted, double hinged corner form, and single hinged for corner, ceiling mounting, etc.

FIG. 1 shows the unassembled parts of the water delivery system 100, those parts generally consisting of:

- at least one cross connector 10 which may divide the water into three different directions of delivery;
- tube couplers 20 having female threaded fittings at each end;
- tee connectors 30 and 35 which may divert the water direction into two delivery directions, tee connectors 30 having slip fittings at each end and a threaded fitting at the center coupling while tee 35 has slip fittings at all three couplings;
- elbow connectors 40 and 45 offset at 90 degree and 45 degree angles, respectively, for changing the direction of the water delivery, the 90 degree elbows 40 forming a corner of the perimeter of the water delivery system 100, as seen in FIG. 1, while the 45 degree elbow connector 45 is connected to the water source via quick connects 80a and 80b for allowing water flow into the water delivery system 100;
- at least one flow diverter 50;
- at least one shower head 55;

90° side outlet elbows 58, which are used to form the bottom perimeter corners of the water deliver system 100, the side outlet being threaded and allowing draining of the system when not in use;

threaded plugs 60, which may be threaded into the threaded fittings of the tee couplers 30 and side outlet elbows 58;

pipe nipples 70 having male threads along their entire length;

male adapters 75 having male threads at a first end and slip connector at a second end;

quick connect connectors 80*a* and 80*b* for joining the water delivery system 100 to a water system; and tubes 90 of various lengths.

It would be evident to one skilled in the art that, although specific threaded/slip joint combinations are specified herein, other combinations of fittings could work with equal effectiveness, as long as the interconnect between standard plumbing features, such as permanently installed plumbing and the portable system, and the portable system and shower heads attached thereto, may be easily made.

The elbow connectors 40, 45 and tee connectors 30 and 35 change the direction of the water flow wherein tubes 90 provide conduits for one-directional water flow. The tubes 90 may be precut to fit the specifications of particular dimensions of the water delivery system 100. Tube couplers 20 may be employed to join sections of threaded pipe 90 to any lateral portion of the assembled water delivery system 100. Male adapters 75 may be employed to adapt pipe 90 to connect to standard female thread fittings.

A water diverter 50 is employed to divert water flow to a single shower head 55 or optionally to the water delivery system 100, as a whole and any additional shower heads 55 attached thereto. Shower head 55 is herein defined as a water outlet which may consist of a hand held shower head, a rigidly mounted shower head, or any other type of water outlet as are known in the art, including hoses. Plugs 60 close the side outlets of tee connectors 30 when a shower head 55 is not installed therein. Additional water diverters 50 may be used at any junction throughout the water delivery system 100, optionally providing flow to individual shower heads 55. When not in use as a water output, the openings of diverters 50 may be sealed with plugs 60.

In as much as one particular configuration is illustrated in FIG. 2, showing a finite number of each of the parts for construction, it is to be appreciated that a larger quantity or lesser quantity of the individual parts to construct alternate embodiments.

Since other modifications and changes varied to fit a particular operating requirements and environment will be apparent to those skilled in the art, the invention is not considered limited to the example chosen for purposes of disclosure, and covers all changes and modifications which do not constitute a departure from the true spirit and scope of the invention.

An intended primary embodiment of the present invention is as a kit of the individual parts for assembly by the consumer. To aid in the assembly, the parts may be color coded 72*a*, numbered 72*b*, lettered 72*c*, or marked by other means known in the art, including such methods as Braille 72*d*. Additionally, in order to facilitate proper alignment of the parts, all non-threaded parts could optionally be formed with a key/keyway (not shown).

A container of PVC primer 82 and PVC glue 84 may be included in the kit, as well as a roll of TEFLON, or similar, plumbing tape 86, shown FIG. 1.

In an alternative embodiment, the inventive system 100 may be sold as an assembled unit.

It would be evident to one skilled in the art that, in order to maintain water pressure, certain water channels may be permanently plugged such that flow is directed through other channels or terminated at the plug.

Having thus described the invention, what is desired to be protected by Letters Patent is presented in the subsequent appended claims.

What is claimed is:

1. A portable water delivery kit for easy transporting and transferring to a water source, said kit comprising:

means for connecting to a water supply for providing water to the water delivery kit, a series of pipe means for providing a conduit for the transfer of water, a series of flow direction changing means for changing the direction of the water flow in said pipe means from one direction to another, at least one shower head assembly for delivery of water to a user, with means for delivering said water in a spray, first coded coupling means formed on said pipe means having at least one connector end, and second coded coupling means having at least one connector end formed on said flow direction changing means for conjugately coupling the first and second coded coupling means such that said series of pipe means and said series of flow direction changing means are coupled in a predetermined, fixed assembly, wherein said first and second coded coupling means formed on said pipe means and said flow direction changing means, respectively, comprises Braille.

2. The portable water delivery kit as claimed in claim 1, wherein said first and second coded coupling means further comprises visual coding indicators formed on the connector ends thereof.

3. The portable water delivery kit as claimed in claim 2, wherein said visual coding indicators comprise color coding indicators.

4. The portable water delivery kit as claimed in claim 2, wherein said visual coding indicators comprise alphabetical coding indicators.

5. The portable water delivery kit as claimed in claim 2, wherein said visual coding indicators comprise numerical coding indicators.

6. The portable water delivery kit as claimed in claim 1, further comprising a container of PVC primer and a container of PVC glue.

7. The portable water delivery kit as claimed in claim 1, further comprising a roll of plumbing tape.

* * * * *